United States Patent [19]
Miyamoto

[11] Patent Number: 6,133,650
[45] Date of Patent: Oct. 17, 2000

[54] DC POWER SOURCE DEVICE WITH STANDBY MODE

[75] Inventor: Hitoshi Miyamoto, Osaka, Japan

[73] Assignee: Funai Electric Co., Ltd., Osaka, Japan

[21] Appl. No.: 09/201,356

[22] Filed: Dec. 1, 1998

[30] Foreign Application Priority Data

Dec. 2, 1997 [JP] Japan .................................. 9-332175

[51] Int. Cl.[7] ..................................................... H02J 1/10
[52] U.S. Cl. ............................................... 307/28; 307/83
[58] Field of Search .......................... 307/28, 83; 315/387; 363/52

[56] References Cited

U.S. PATENT DOCUMENTS 5,179,331  1/1993  Sloot ......................................... 363/21

*Primary Examiner*—Shawn Riley
*Attorney, Agent, or Firm*—Lackenbach, Siegel, Marzullo, Aronson & Greenspan, P.C.

[57] ABSTRACT

A DC power source device in which the voltage dividing ratio of a voltage dividing circuit of an error detecting circuit is changed from a reference value to a value smaller than the reference value thereby to decrease the voltages of DC outputs. In the device, a bleeder circuit in which the connection and disconnection of a bleeder resistor are switchable, is connected to a reference DC output among the above DC outputs which is to be subjected to error detecting. After the voltage dividing ratio is changed to the smaller value, the bleeder resistor is connected to the reference DC output for a predetermined period of time.

8 Claims, 5 Drawing Sheets

DC POWER SOURCE DEVICE WITH STANDBY MODE

BACKGROUND OF THE INVENTION

1. Field of the Invention

This invention relates to a DC power source device with a plurality of DC outputs.

2. Description of the Related Art

In a television set, in the case where a mode is shifted from an operation mode to a standby mode, it is required to stop the operation of a television section while preventing the occurrence of a spot leaving. On the other hand, it is required to supply a predetermined DC output to a control microcomputer even when it is in a standby state. A DC power source for meeting these requirements has been proposed in Japanese Patent Unexamined Publication No. Hei. 8-130874.

That is, in this technique, the voltage dividing ratio of a voltage dividing circuit provided in an error detecting circuit is changeable. In a standby mode, control is so made to decrease the voltage dividing ratio. Therefore, if it is assumed that the control target value in the operation mode is for instance 112V, then in the standby mode, the control target value is for instance 40V. Accordingly, when the mode is shifted from the operation mode to the standby mode, the voltage of the DC output (hereinafter referred to as "a first DC output") supplied to the television section is decreased from 112V to 40V. Hence, in the television section, the operation is stopped without the occurrence of a spot leaving. A voltage-drop type regulator is used for a power source for the microcomputer and for instance, the DC output (hereinafter referred to as "a second DC output") which is 27V in the operation mode and 8.5V in the standby mode is decreased to 5V. Accordingly, in the standby mode, even when the voltage of the second DC output is decreased, a standard value of 5V is supplied to the microcomputer.

However, in the case where the above-described power source is applied to a television set with a video cassette recorder, the following problems are involved. That is, the voltage stabilizing control is based on a voltage error of the first DC output which is the power source of the horizontal circuit of the television section. Hence, when the voltage dividing ratio of the voltage dividing circuit is decreased, then the first DC output voltage decreasing control is carried out until the first DC output voltage becomes approximately 40V. Therefore, the power supplied from the primary side becomes approximately zero (0) immediately after the mode is shifted to the standby mode. That is, until the first DC output voltage becomes 40V, the voltage of the second DC output is maintained only by the charge of the smoothing capacitor. As a result, in the case where a voltage-drop type regulator is employed whose input voltage minimum value is 7V for stabilizing the output voltage, the second DC output voltage may become lower than the minimum value of 7V. In the case where the second DC output voltage becomes lower than 7V, the output voltage of the voltage-drop type regulator becomes lower than 5V, and therefore the microcomputer may have troubles in its operation.

Further, in the case of a television set with a video cassette recorder, sometimes the television section is not operated but the video section is operated as in the case of a timer image recording operation or a video cassette ejecting operation. In the case of such an operation, the load current of the first DC output is approximately zero (0) in value. Accordingly, even in the case where the load power of a DC output other than the first DC output is increased, the supply power from the primary side does not show an increase corresponding to the load of the secondary side. As a result, when the motor in the video section is rotated, the voltage of the motor operating power source, namely, the voltage of the DC output is greatly decreased. Therefore, a problem occurs with the rotation of a motor or the like adapted to eject a video cassette.

SUMMARY OF THE INVENTION

An object of the invention is to provide a DC power source device in which a bleeder resistor is connected to a DC output the error of which is to be detected, so that when the output voltage starts decreasing, the voltages of DC outputs whose voltage errors are not detected are prevented from becoming lower than predetermined values without increase of the power consumption.

In order to achieve the above object, the invention provides a DC power source device which has a plurality of DC outputs, detects an error of an output voltage based on a voltage-divided voltage of a voltage dividing circuit adapted to voltage-divide one of the plurality of DC outputs, feeds back the error thus detected to a switching circuit on a primary side, and changes a voltage dividing ratio of the voltage dividing circuit from a predetermined value to a value smaller than the predetermined value thereby to decrease voltages of the DC outputs, the DC power source device, with the one DC output as a reference DC output. The device includes a bleeder resistor one of terminals of which is connected to the reference DC output, and the other terminal of which is connected to a secondary side ground level. A switch is provided in a current path of the bleeder resistor, for opening and closing the current path, wherein after the voltage dividing ratio is changed to the value smaller than the predetermined value, the switch is maintained closed for a predetermined period of time.

That is, after the voltage dividing ratio is decreased, the switch is kept closed for the predetermined period of time (for instance, 100 msec). Therefore, the voltage of the reference DC output is quickly decreased to the voltage corresponding to the decreased voltage dividing ratio because of the current flowing in the bleeder resistor. Hence, the power supplied from the primary side which has been decreased by the change of the voltage dividing ratio is quickly returned to a value corresponding to the load power of the secondary side. As a result, power is quickly supplied again to the DC outputs except the reference DC output. Accordingly, the DC outputs except the reference DC output are prevented from being decreased to voltages lower than the voltage corresponding to the decreased voltage dividing ratio. Furthermore, since the switch is closed only for the predetermined period of time, the power consumption by the bleeder resistor can be ignored.

Further, the invention provides a DC power source device which has a plurality of DC outputs, detects an error of an output voltage based on a voltage-divided voltage of a voltage dividing circuit adapted to voltage-divide one of the plurality of DC outputs, feeds back the error thus detected to a switching circuit on a primary side, and changes a voltage dividing ratio of the voltage dividing circuit from a predetermined value to a value smaller than the predetermined value thereby to decrease voltages of the DC outputs, the DC power source device, with the one DC output as a reference DC output. The device includes a bleeder resistor, one of terminals of the bleeder resistor being connected to a DC output whose voltage is lower than a voltage of the reference DC output among the plurality of DC outputs except the reference DC output, and the other terminal being connected to the reference DC output.

That is, the bleeder resistor is connected to the reference DC output. Therefore, the voltage of the reference DC output is quickly decreased to a voltage corresponding to the voltage dividing ratio which is decreased by the current flowing in the bleeder resistor. Accordingly, the supply power of the primary side which has been decreased by the change of the voltage dividing ratio, is quickly returned to a value corresponding to the load power of the secondary side. As a result, quickly power is supplied again to the DC outputs except the reference DC output. This feature prevents the DC outputs except the reference DC output from decreasing to voltages lower than the voltage corresponding to the voltage dividing ratio which has been decreased. Furthermore, the current of the bleeder resistor becomes power for the DC output to which the bleeder resistor is connected. In addition, the terminal voltage of the bleeder resistor is lower than the voltage of the reference DC output. Therefore, the power consumption by the bleeder resistor is small.

Furthermore, the invention provides a DC power source device which has a plurality of DC outputs, detects an error of an output voltage based on a voltage-divided voltage of a voltage dividing circuit adapted to voltage-divide one of the plurality of DC outputs, feeds back the error thus detected to a switching circuit on a primary side, and changes a voltage dividing ratio of the voltage dividing circuit from a predetermined value to a value smaller than the predetermined value thereby to decrease voltages of the DC outputs, wherein, with the one DC output as a reference DC output, voltages of the plurality of DC outputs except the reference DC output are monitored, and when the voltages thus monitored become lower than a predetermined voltage, the voltage dividing ratio of the voltage dividing circuit is changed to the value smaller than the predetermined value.

That is, the fact that the voltage thus monitored becomes lower than the predetermined value, occurs when the load of the DC output becomes lower in resistance, as in the case of the short-circuiting of the load. On the other hand, in the case where the voltage dividing ratio of the voltage dividing circuit is decreased, the DC outputs except the reference DC output are equivalently increased in internal resistance. Accordingly, even if the load is decreased in resistance, the flowing current is small, and therefore the amount of generated heat is small.

DETAILED DESCRIPTION OF THE PREFERRED EMBODIMENTS

Figure 1:
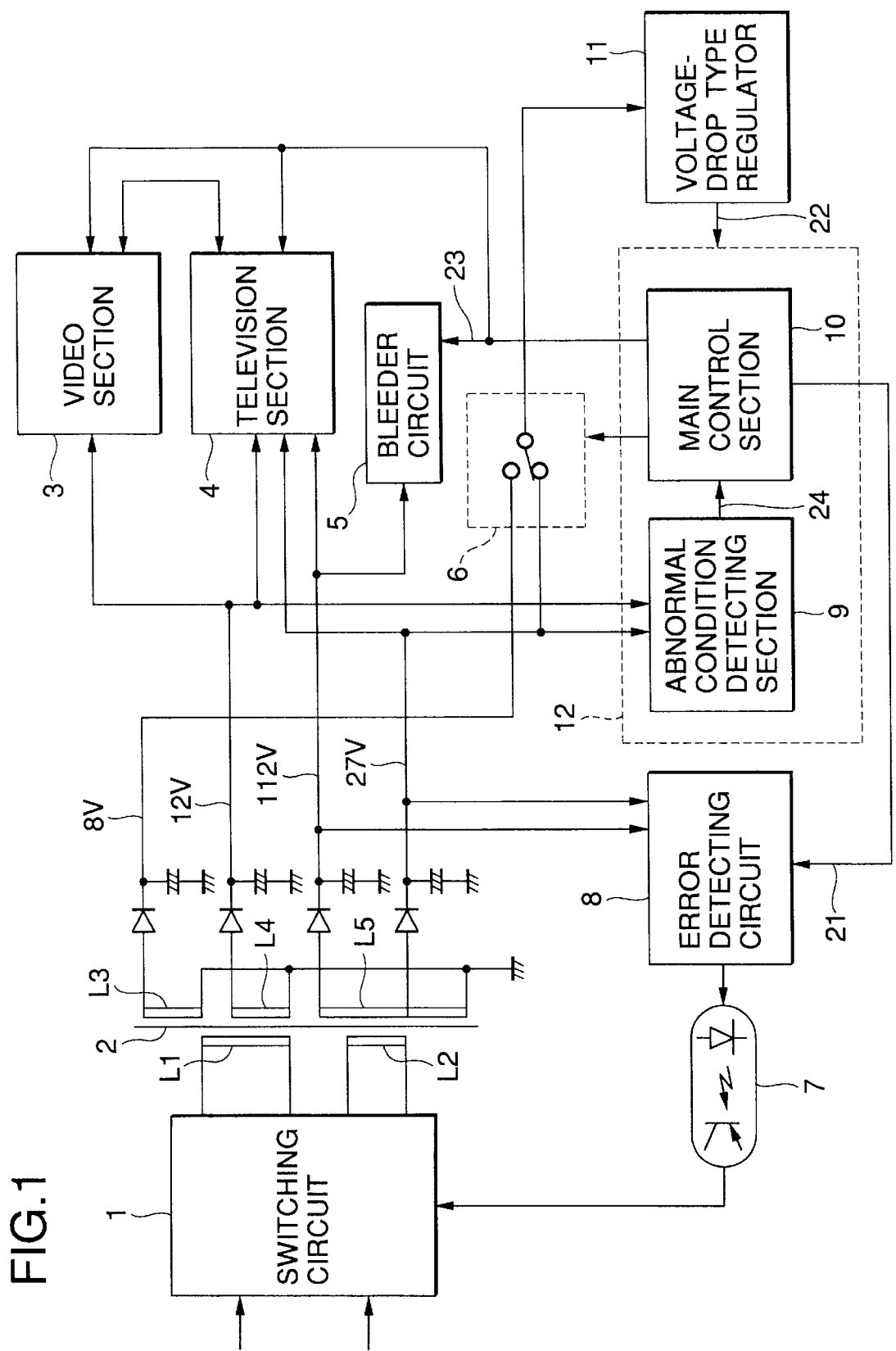
FIG. 1 is a block diagram showing a DC power source device, which constitutes a preferred embodiment of the invention.

A DC power source device, which constitutes an embodiment of the invention, will be described with reference to the accompanying drawings. FIG. 1 is a block diagram showing the electrical arrangement of the DC power source device which is applied to a television set with a video cassette recorder.

In FIG. 1, a television section 4 is a block including a tuner section, a processing section for the output signal of the tuner section, and a CRT; and a video section 3 is a block for performing an image recording operation and an image reproducing operation. The video section 3 includes an image recording/reproducing section, and a mechanism for running a video cassette tape.

A switching circuit 1 is a block including a switching transistor, and a control transistor for controlling the base current of the switching transistor. A DC source which is obtained by rectifying and smoothing a commercial power source is applied to the switching circuit 1. A primary coil L1 and a base coil L2, which are wound on a transformer core 2, are connected to the switching circuit 1. In the switching circuit 1, the switching of current flowing in the primary coil L1 is carried out based on the error output given by an error detecting circuit 8 through a photocoupler 7.

Two secondary coils L3 and L4, which have no taps, and a secondary coil L5, which has a tap, are wound on the transformer core 2. The outputs of the secondary coils L3 through L5 are rectified and smoothed by diodes and capacitors. More specifically, a DC output 8V obtained by rectifying and smoothing the output of the secondary coil L3 is a power source for a microcomputer; a DC output 12V obtained by rectifying and smoothing the output of the secondary coil L4 is a power source for a motor, an audio signal circuit, and other analog signal circuits in the television section 4 and the video section 3; a DC output 112V obtained by rectifying and smoothing the output of the end terminal of the secondary coil L5 is a power source for a horizontal circuit in the television section 4; and a DC output 27V obtained by rectifying and smoothing the output of the tap of the secondary coil L5 is a power source for a vertical circuit in the television section 4.

Hence, in the operation mode; that is, when the voltage dividing ratio of the voltage dividing circuit of the error detecting circuit 8 is a predetermined value, the voltage of the DC output 8V is 8V, the voltage of the DC output 12V is 12V, the voltage of the DC output 27V is 27V, and the voltage of the DC output 112V is 112V. On the other hand, in the standby mode; that is, the voltage dividing ratio is smaller than the predetermined value, the voltage of the DC output 8V is 2.3V, the voltage of the DC output 12V is 4V, the voltage of the DC output 27V is 8.5V, and the voltage of the DC output 112V is 40V.

The error detecting circuit 8 is a block including the voltage dividing circuit adapted to voltage-divide the DC output 112V (which is a reference DC output) , a circuit adapted to generate a reference voltage, and a circuit adapted to detect a difference between a voltage-divided voltage and a reference voltage. The error detecting circuit 8 detects a voltage error between the reference voltage and the voltage-divided voltage of the DC output 112V, and drives the photocoupler 7 with the current corresponding to the voltage error thus detected. Further, the voltage dividing ratio of the voltage dividing circuit is changeable.

A bleeder circuit 5 is a block including a bleeder resistor which is a load for the DC output 112V, and a switch for opening/closing the connection of the bleeder resistor. A switch circuit 6 is a block which switches the input of a voltage-drop type regulator 11 to the DC output 8V or 27V. The voltage-drop type regulator 11 is a block which decreases a DC output provided by the switch circuit 6 to 5V, and supplies an output 22 thus decreased to the microcomputer 12.

An abnormal condition detecting section 9 is a block which monitors the voltages of the two DC outputs 12V and 27V (excluding the reference DC output, namely, the DC output 112V, and the DC output 8V which is a power source for the microcomputer in the operation mode from the four DC outputs 8V, 12V, 27V and 112V). When at least one of the DC outputs 12V and 27V becomes approximately a predetermined value of zero (0), the section 9 applies an output 24 which indicates the fact that the voltage is decreased to a main control section 10.

The main control section 10 is a block adapted to mainly control the video section 3 and the television section 4. Furthermore, the section 10 controls the voltage dividing ratio of the voltage dividing circuit in the error detecting circuit 8 thereby to switch the modes of the video section 3 and the television section 4 over to the operation mode or the standby mode. In addition, as the mode is switched in the above-described manner, the section 10 switches the connection of the switch circuit 6. Further, the section 10 controls the bleeder circuit 5. In the case where, in the operation mode, the abnormal condition detecting section 9 issues the output 24 indicating a decrease of the voltage, the section 10 changes the voltage dividing ratio of the error detecting circuit 8 from the predetermined value to a value smaller than the predetermined value, thereby to decrease the voltages of all the DC outputs 8V, 12V, 27V and 112V.

The main control section 10 is a block designed as follows: It includes the software as a main section which is carried out by the microcomputer 12. In order to receive an instruction from a remote control unit or from a switch on the operating panel, even when the television section 4 or the video section 3 is not in operation, the section 10 must be in the operation state. The abnormal condition detecting section 9 is a block which is a part of the peripheral circuit of the microcomputer 12.

The error detecting circuit 8 will be described with reference to FIG. 2 in detail.

Figure 2:
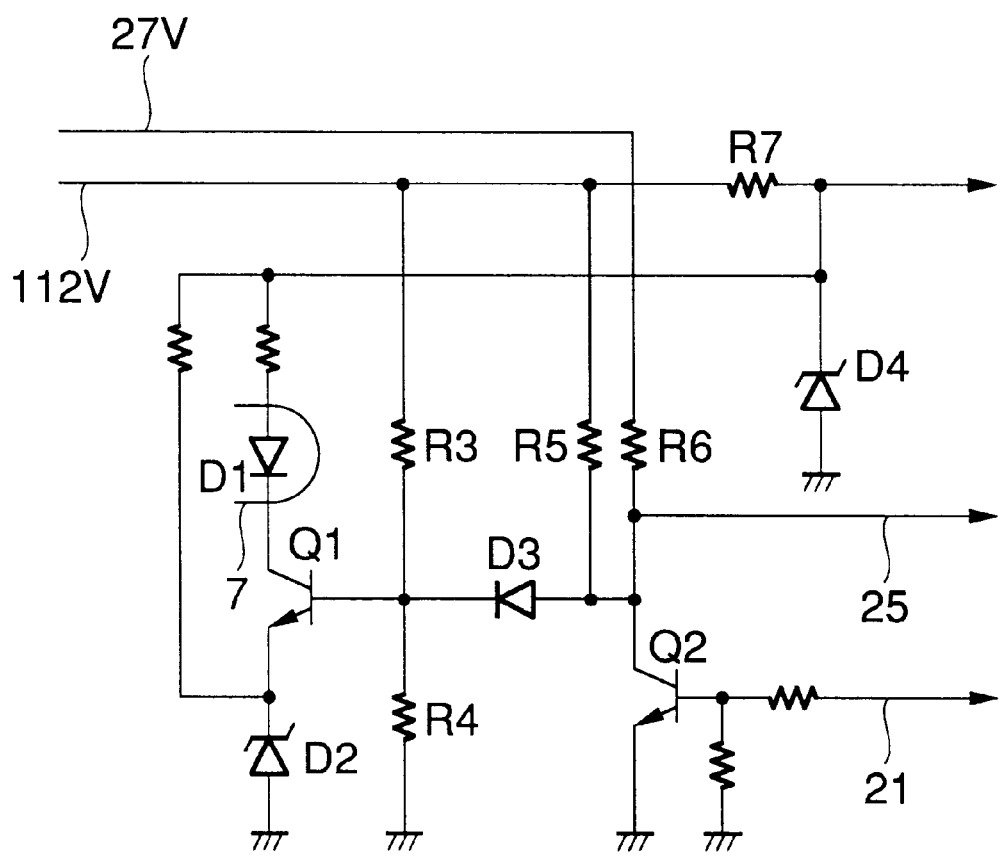
FIG. 2 is an electrical circuit diagram showing the arrangement of an error detecting circuit in detail.

In FIG. 2, a transistor Q1 is an element which detects the voltage error of the DC output 112V, and drives a light emitting diode D1 with a current corresponding to the error thus detected. Therefore, a reference voltage formed by a Zener diode D2 is applied to the emitter of the transistor Q1, while a voltage-divided voltage of a voltage dividing circuit consisting of resistors R3 and R4 is applied to the base thereof. A resistor R5 is an element which decreases the voltage dividing ratio (predetermined value) of the voltage dividing circuit consisting of the resistors R3 and R4 to a value smaller than the predetermined value.

That is, when a transistor Q2 which is on/off-controlled by the output 21 of the main control section 10 is placed in "on" state, the anode potential of a diode D3 becomes lower than the cathode potential thereof, and the resistor 5 is separated from the resistor R4. On the other hand, when the transistor Q2 is turned off, current flows in the diode D3, and the resistor R5 is equivalently connected in parallel to the resistor R4. In other words, when the transistor Q2 is turned on, the voltage dividing ratio of the voltage dividing circuit becomes the predetermined value, and the transistor Q1 performs the error detection so that the voltage of the DC output 112V is 112V. On the other hand, when the transistor Q2 is turned off, the voltage dividing ratio is decreased, and the transistor Q1 performs the error detection so that the voltage of the DC output 112V is 40V.

A circuit consisting of a resistor R7 and a Zener diode D4 is a block to form a voltage of 32V for the tuner. A resistor R6 is an element which, when the transistor Q2 is turned off, causes the DC output 27V to be applied to the voltage dividing circuit; that is, it slightly decreases the speed of voltage drop of the DC output 27V when the voltage dividing ratio is decreased. An output 25 provided by the collector of the transistor Q2 is an output which is obtained by inverting the logic of the output 21 of the main control circuit 10. The output 25 is a signal for controlling the operation (switching the connection) of the switch circuit 6, as described later.

Figure 3:
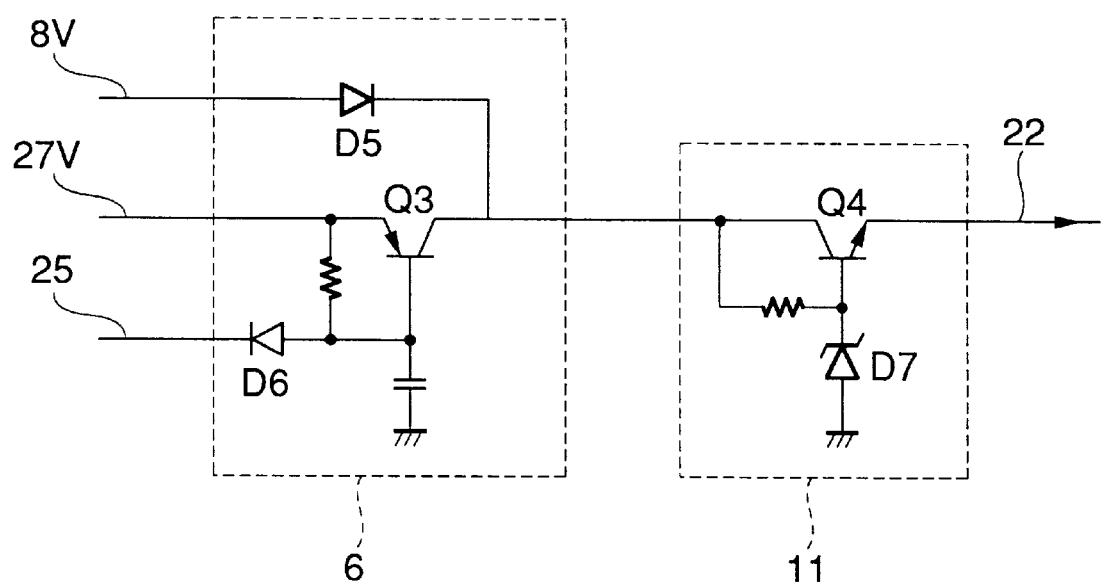
FIG. 3 is an electrical circuit diagram showing the arrangement of a switch circuit and a voltage-drop type regulator in detail.

Now, the arrangement of the switch circuit 6 and the voltage-drop type regulator 11 will be described with reference to FIG. 3 in detail.

A transistor Q3 in the switch circuit 6 is an element which on/off-controls the DC output 27V. That is, when the transistor Q3 is turned on, the voltage of the cathode of a diode D5 becomes higher than the voltage of the anode thereof, and the DC output 8V is separated from the voltage-drop type regulator 11. Accordingly, when the transistor Q3 is turned on, the DC output 27V is applied to the voltage-drop type regulator 11. On the other hand, when the transistor Q3 is turned off, the DC output 27V is separated from the voltage-drop type regulator 11, and the DC output 8V is applied to the voltage-drop type regulator 11.

It is necessary that the on/off operation of the transistor Q3 is in association with the switching of the voltage dividing ratio of the error detecting circuit 8. Further, it is necessary that, in the case where the voltage dividing ratio is the predetermined value, the transistor Q3 is turned off, and in the case where the voltage dividing ratio is smaller, the transistor Q3 is turned on. Therefore, in the on/off control of the transistor Q3, the level of the output 21 of the main control section 10 should be inverted. For this purpose, the output 25 provided by the error detecting circuit 8 is applied through a diode D6 adapted to prevent the flow-in of current, to the base of the transistor Q3.

In FIG. 1, for clarification in control relation, the switch circuit 6 is so indicated that the connection is switched by the output of the main control section 10. However, in practice, as shown in FIGS. 2 and 3, in order to minimize the number of output lines of the microcomputer 12, the output 25 inverted by the error detecting circuit 8 is employed to switch the connection of the switch circuit 6.

The voltage-drop type regulator 11 forms the DC output 22 of 5V, which is an operating power source for the microcomputer 12. Therefore, a voltage stabilized by a Zener diode D7 is applied to the base of a transistor Q4. The lowest value of the input voltage which can stabilize the DC output 22 to 5V is about 7V in the embodiment.

Figure 4:
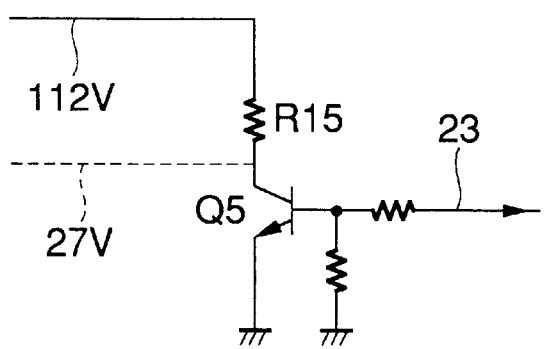
FIG. 4 is an electrical circuit diagram showing the arrangement of a bleeder circuit in detail.

The arrangement of the bleeder circuit 5 will be described with reference to FIG. 4 in detail.

The DC output 112V is connected to one of the terminals of a bleeder resistor R15, while the other terminal of the bleeder resistor R15 is connected to the collector of a transistor Q6. The transistor Q6 is on/off-controlled by the output 23 of the main control section 10. Accordingly, when the transistor Q6 is turned on, the bleeder resistor R15 is connected to the DC output 112V; while when the transistor Q6 is turned off, the bleeder resistor R15 is disconnected therefrom.

Figure 5:
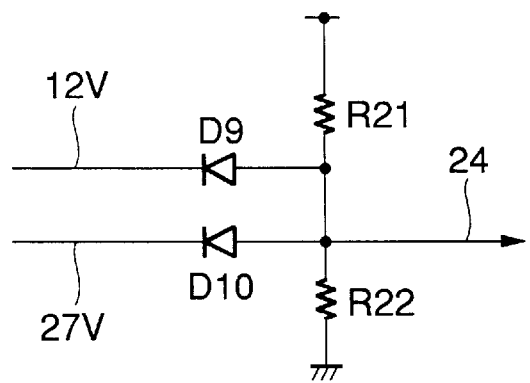
FIG. 5 is an electrical circuit diagram showing the arrangement of an abnormal condition detecting section in detail.

The arrangement of the abnormal condition detecting section 9 will be described with reference to FIG. 5 in detail.

One of the two terminals of a resistor R21 is connected to +5V. One of the two terminals of a resistor R22 is connected to the other terminal of the resistor R21, and the other terminal thereof is connected to the secondary side ground level. The resistors R21 and R22 form a voltage dividing circuit for voltage-dividing +5V. The voltage-divided output 24 is of the level which the main control section 10 recognizes "H" level; more specifically, it is set to 3.5V. The connecting point of the resistors R21 and R22 is connected to the DC outputs 12V and 27V respectively through diodes D9 and D10 which are adapted to prevent the flow-in of current.

Hence, when the load of the DC output 12V is problematic, and when the voltage of the DC output 12V becomes approximately 0V, the output 24 is set to "L" level. When the load of the DC output 27V is problematic, and the voltage of the DC output 27V becomes approximately 0V, the output 24 is set to "L" level. That is, the abnormal condition detecting section 9 sets the output 24 to "L" level to inform the main control section 10 of the fact that at least one of the loads of the DC outputs 12V and 27V is troubled.

Figure 6:
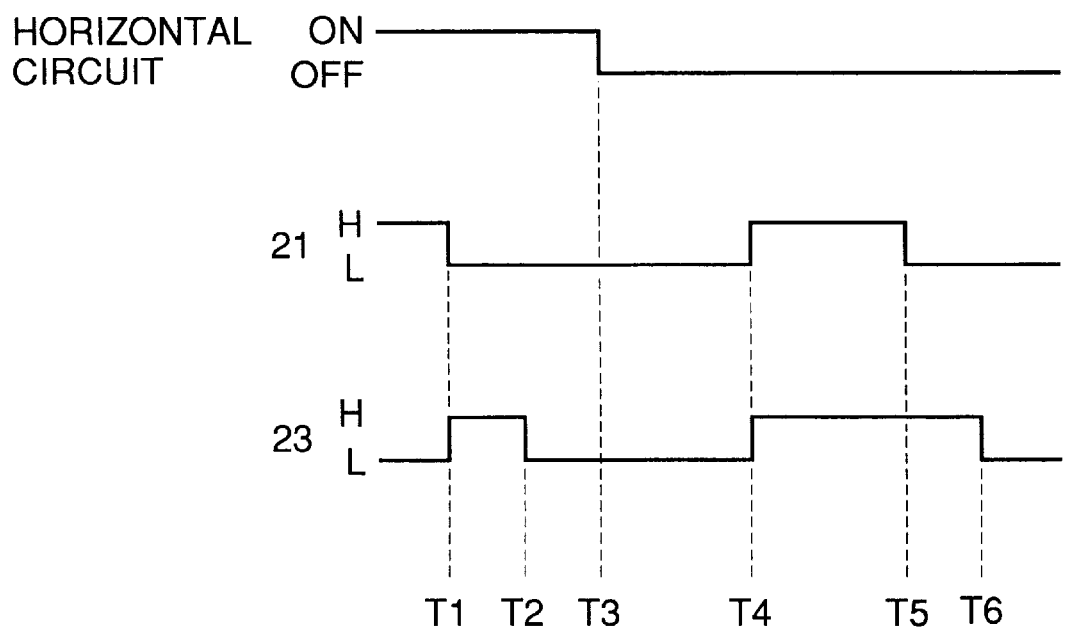
FIG. 6 is an explanatory diagram showing variations of main signals in the embodiment of the invention.
Figure 7:
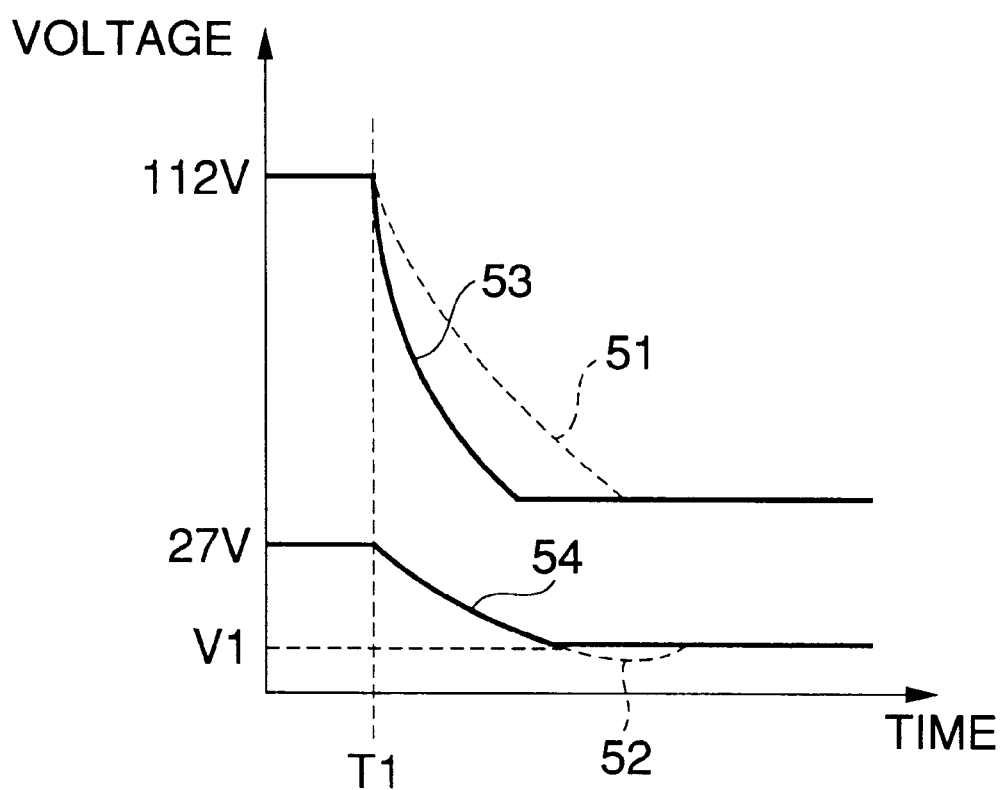
FIG. 7 is an explanatory diagram showing variations in voltages of DC outputs.

FIG. 6 is an explanatory diagram showing variations of main signals in the embodiment. FIG. 7 is an explanatory diagram showing variations in voltage of the DC outputs 27V and 112V. The operation of the embodiment will be described with reference to those figures if required.

In the mode that only the television section 4 is operated, or both the television section 4 and the video section 3 are operated, the main control section 10 places the horizontal circuit of the television section 4 in "on" state, and sets the voltages of the DC outputs 8V, 12V, 27V and 112V respectively to 8V, 12V, 27V and 112V, by setting the output 21 to "H" level and the voltage dividing ratio to the predetermined value. When the output 21 is at "H" level, the output 25 is set to "L" level. Accordingly, the DC output 8V is applied through the switch circuit 6 to the voltage-drop type regulator 11. Further, by setting the output 23 to "L" level, the bleeder resistor R15 is electrically disconnected.

When it is required to shift the above-described mode to the standby mode that the operations of the television section 4 and the video section 3 are stopped, the output 21 is set to "L" level, and the output 23 is raised to "H" level (time T1). When the output 21 is set to "L" level, the voltage dividing ratio of the voltage dividing circuit of the error detecting circuit 8 is decreased, and the voltages of the DC outputs 8V, 12V, 27V and 112V starts decreasing. Since the output 23 is raised to "H" level, the breeder resistor R15 is connected to the DC output 112V. Hence, the voltage of the DC output 112V is decreased quickly from 112V to 40V.

When the output 21 is set to "L" level, the output 25 is raised to "H" level. Therefore, the DC output 27V is applied through the switch circuit 6 to the voltage-drop type regulator 11. Accordingly, the voltage of the DC output 27V must be maintain equal to or higher than 7.5V (the sum of 7V which is the lowest value of the voltage-drop type regulator 11 and the voltage drop across the switch circuit 6). On the other hand, after time T1, the voltage of the DC output 112V quickly decreases as indicated by reference numeral 53 in FIG. 7. Therefore, the period of time required for increase of the power supplied from the primary side is short. That is, before the voltage of the DC output 27V becomes equal to or lower than 8.5V, the power supplied from the primary side is increased. This fact prevents the voltage of the DC output 27V from becoming equal to or lower than 8.5V (cf. reference numeral 54 in FIG. 7).

In FIG. 7, the broken line 51 indicates variations in voltage of the DC output 112V in the case where the bleeder resistor 15 is not electrically connected and in this case, the voltage drop speed is slow. Hence, the voltage of the DC output 27 becomes temporarily equal to or lower than V1 (7.5V) as indicated by the broken line 52. However, in the case where the bleeder resistor R15 is connected to increase the voltage drop speed of the DC output 112V, the voltage of the DC output 27V is maintained equal to or higher than V1. Hence, in practice, the value of the bleeder resistor R15 is determined as follows: The variation in voltage of the DC output 27V after time T1 is detected, and the value of the bleeder resistor R15 is set to a value with which the voltage of the DC output 27V will never become equal to or lower than V1.

After the voltage of the DC output 112V is decreased to 40V, in order to prevent the increase of power consumption, the output 23 is set to "L" level to electrically disconnect the bleeder resistor R15 from the DC output 112 (time T2). Thereafter, the horizontal circuit of the television section 4 is turned off (time T3).

Now, the case where, as in the case of a timer image recording operation or a video cassette ejecting operation, only the video section 3 is operated while the television section 4 is not operated, will be described.

In the case where only the video section 3 is operated, with the horizontal circuit of the television section 4 maintained in "off" state, the output 21 is raised to "H" level. Further, the output 23 is raised to "H" level to electrically connect the bleeder resistor 15 to the DC output 112V (time T4).

When the output 21 is raised to "H" level, control is so made that the voltage dividing ratio of the voltage dividing circuit of the error detecting circuit 8 becomes the predetermined value, and the voltage of the DC output 112V becomes 112V. In this case, the bleeder resistor R15 is electrically connected to the DC output 112V. Hence, when the voltages of the DC outputs 12V and 27V are decreased, the voltage of the DC output 112V is also decreased. Therefore, control is so made that the voltages of the DC outputs 8V, 12V, 27V and 112V become 8V, 12V, 27V and 112V, respectively. As a result, also in the case, where the motor of the video section 3 is driven, to increase the load of the DC output 12V, the voltage of the DC output 12V is maintained at 12V.

When, in the case where only the video section 3 is operated, it is required to stop the operation of the video section 3, the output 21 is set to "L" level to decrease the voltage dividing ratio thereby to decrease the voltages of the DC outputs 8V, 12V, 27V and 112V (time T5). In this case, the bleeder resistor R15 is electrically connected to the DC output 112V, and therefore the voltage of the DC output 27V is maintained equal to or higher than 8V. After the voltage of the DC output 112V decreases to 40V, the output 23 is set to "L" level thereby to disconnect the bleeder resistor R15 from the DC output 112V (time T6).

On the other hand, it is assumed that in the case where only the television section 4, or only the video section 3, or both of the sections 4 and 3 are in operation, the output 21 is raised to "H" level, so that the television section 4 or the video section 3 is troubled, and the voltages of the DC outputs 12V and 27V are decreased approximately to 0V. In this case, the output 24 of the abnormal condition detecting section 9 is changed from "H" level to "L" level. In the case where, with the output 21 maintained at "H" level, the output 24 is set to "L" level, the main control section 10 determines that the television section 4 or the video section 3 is troubled, and changes the level of the output 21 to "L" level.

When the output 21 is set to "L" level, the DC outputs 12V and 27V equivalently increase the internal resistances. Hence, even in the case where for instance short-circuiting occurs in the television section 4 or the video section 3, the current values of the DC outputs 12V and 27V are small. Hence, the amount of heat generated by the trouble is suppressed; that is, the television section 4 or the video section 3 is prevented from being abnormally heated.

Now, another embodiment of the invention will be described.

In this embodiment, the arrangement of a bleeder circuit 5 is such that a bleeder resistor R15 is always connected between the DC output 112V which is the reference DC output and the DC output 27V whose voltage is lower than that of the DC output 112V. Hence, the bleeder circuit 5 is obtained by modifying the circuit of FIG. 4 as follows: The transistor Q6 is eliminated, and the two resistors are eliminated which are connected to the base of the transistor Q6. That is, the bleeder circuit 5 includes only the bleeder resistor R15 one of the terminals of which is connected to the DC output 112V, and the other terminal to the DC output 27V as indicated by the broken line.

In this embodiment, a current attributing to the bleeder resistor R15 always flows in the DC output 112V. Hence, when the level of the output 21 is changed from "H" level to "L" level, owing to the current flowing through the bleeder resistor R15 to the television section 4, the voltage of the DC output 112V is quickly decreased towards 40V. Accordingly, the voltage of the DC output 27V is prevented from becoming a voltage lower than the voltage V1 because of the fact that the voltage drop speed of the DC output 112V is high, and because of the current supplied through the bleeder resistor R15.

The DC power source device of the first embodiment is applied to a DC power source device which changes the voltage dividing ratio of the voltage dividing circuit adapted to detect the output voltage error from the reference value to a value smaller than the reference value thereby to decrease the DC output voltage. The device comprises: the bleeder resistor which, with a DC output whose error is to be detected as the reference DC output, has one terminal connected to the reference DC output and the other terminal connected to the secondary side ground level; and the switch which is inserted in the current path of the bleeder resistor, and opens/closes the aforementioned current path. In the device, after the voltage dividing ratio is set to the aforementioned smaller value, the switch is closed for the predetermined period of time, and owing to the current flowing in the bleeder resistor the voltage of the reference DC output is quickly decreased to a voltage corresponding to the decreased voltage dividing ratio. As was described above, the switch is closed only for the predetermined period of time. Therefore, the power consumption by the bleeder resistor can be ignored. Hence, the difficulty can be eliminated without increase of the power consumption that, when the output voltage starts decreasing, the voltage of the DC output whose voltage error is not detected becomes lower than the predetermined value.

The DC power source device of the second embodiment is applied to a DC power source device which changes the voltage dividing ratio of the voltage dividing circuit adapted to detect the output voltage error from the reference value to a value smaller than the reference value thereby to decrease the DC output voltage. The device comprises: the bleeder resistor which, with a DC output whose error is to be detected as the reference DC output, has one terminal connected to a DC output whose voltage is lower than the voltage of the reference DC output among a plurality of DC outputs except the reference DC output, and the other terminal connected to the reference DC output. That is, the bleeder resistor is connected to the reference DC output. Hence, owing to the current flowing in the bleeder resistor, the voltage of the reference DC output is quickly decreased to a voltage corresponding to the decreased voltage dividing ratio. The current of the bleeder resistor becomes a part of the output current of the DC output to which one terminal of the bleeder resistor is connected, and the terminal voltage of the bleeder resistor becomes lower than the voltage of the reference DC output. Hence, the power consumption by the bleeder resistor is small. Therefore, the difficulty can be eliminated without increase of the power consumption that, when the output voltage starts decreasing, the voltage of the DC output whose voltage error is not detected becomes lower than the predetermined value.

What is claimed is:

1. A DC power source device which has a plurality of DC outputs, detects an error of an output voltage based on a voltage-divided voltage of a voltage dividing circuit adapted to voltage-divide one of the plurality of DC outputs, feed back the error thus detected to the switching circuit on a primary side, and change a voltage dividing ratio of the voltage dividing circuit from a predetermined value to a value smaller than the predetermined value thereby to decrease voltages of the DC outputs, said DC power source device, with said one DC output as a reference DC output, comprising:

a bleeder resistor one of the terminals of which is connected to the reference DC output, and the other terminal is connected to a secondary side ground level; and a switch providing in a current path of said bleeder resistor, for opening and closing the current path for a predetermined period of time, after the voltage dividing ratio is changed to a value smaller than said predetermined value.

2. The DC power source device as claimed in claim 1, further comprising a voltage-drop type regulator which decreases one of the plurality of DC outputs except the reference DC output to a predetermined voltage, and supplies the DC output whose voltage is thus decreased, as an operating power source, to a microcomputer adapted to control a load device.

3. A DC power source device comprising a plurality of DC outputs, means for detecting an error of an output voltage based on a voltage-divided voltage of a voltage dividing circuit adapted to voltage-divide one of the plurality of DC outputs, means for feeding back the error thus detected to a switching circuit on a primary side, and means for changing a voltage dividing ratio of the voltage dividing circuit from a predetermined value to a value smaller than the predetermined value thereby to decrease voltages of the DC outputs, said DC power source device, with said one DC output as reference DC output, a bleeder resistor, one of the terminals of said bleeder resistor being connected to a DC output whose voltage is lower than a voltage of the reference DC output among the plurality of DC outputs except the reference DC outputs, and the other terminal being connected to the reference DC output.

4. The DC power source device as claimed in claim 3, further comprising a voltage-drop type regulator which decreases one of the plurality of DC outputs except the reference DC output to a predetermined voltage, and supplies the DC output whose voltage is thus decreased, as an operating power source, to a microcomputer adapted to control a load device.

5. A DC power source device comprising a plurality of DC outputs, means for detecting an error of an output voltage based on a voltage-divided voltage of a voltage dividing circuit adapted to voltage-divide one of the plurality of DC outputs, means for feeding back the error thus detected to a switching circuit on a primary side, and means for changing a voltage dividing ratio of the voltage dividing circuit from a predetermined value to a value smaller than the predetermined value thereby to decrease voltages of the DC outputs, wherein, with said one DC output as a reference DC output, voltages of the plurality of DC outputs except the reference DC output are monitored, and when the voltages thus monitored become lower than a predetermined voltage, the voltage dividing ration of the voltage dividing circuit is changed to the value smaller than the predetermined value.

6. A DC power source device adapted to supply an operating power source to a television set with a video cassette recorder, which has a plurality of DC outputs, detects an error of an output voltage based on a voltage-divided voltage of a voltage dividing circuit adapted to voltage-divide one of the plurality of DC outputs, feed back the error thus detected to the switching circuit on a primary side, and change a voltage dividing ratio of the voltage dividing circuit from a predetermined value to a value smaller than the predetermined value thereby to decrease voltages of the DC outputs, said DC power source device, with said one DC output as a reference DC output, comprising:

a bleeder resistor one of the terminals of which is connected to the reference DC output, and the other terminal is connected to a secondary side ground level; and a switch providing in a current path of said bleeder resistor, for opening and closing the current path, wherein after the voltage dividing ratio is changed to the value smaller than the predetermined value, said switch is maintained closed for a predetermined period of time, and wherein said reference DC output is an operating power source for a horizontal circuit in a television section, and one of the plurality of DC outputs except the reference DC output is an operating power source for a motor in a video section.

7. A DC power source device adapted to supply an operating power source to a television set with a video cassette recorder, which has a plurality of DC outputs, detects an error of an output voltage based on a voltage-divided voltage of a voltage dividing circuit adapted to voltage-divide one of the plurality of DC outputs, feed back the error thus detected to the switching circuit on a primary side, and change a voltage dividing ratio of the voltage dividing circuit from a predetermined value to a value smaller than the predetermined value thereby to decrease voltages of the DC outputs, said DC power source device, with said one DC output as a reference DC output, comprising:

a bleeder resistor one of the terminals of which is connected to the reference DC output, and the other terminal is connected to a secondary side ground level; and a switch providing in a current path of said bleeder resistor, for opening and closing the current path, wherein after the voltage dividing ratio is change to the value smaller than the predetermined value, said switch is maintained closed for a predetermined period of time, and wherein the reference DC output is an operating power source for a horizontal circuit in a television section, and one of a plurality of DC outputs except the reference DC output is an operating power source of a motor in a video section, and when the video section is operated without operating the horizontal circuit, said switch is closed.

8. A DC power source device adapted to supply an operating power source to a television set with a video cassette recorder, which has a plurality of DC outputs, detects an error of an output voltage based on a voltage-divided voltage of a voltage dividing circuit adapted to voltage-divide one of the plurality of DC outputs, feed back the error thus detected to the switching circuit on a primary side, and change a voltage dividing ratio of the voltage dividing circuit from a predetermined value to a value smaller than the predetermined value thereby to decrease voltages of the DC outputs, said DC power source device, with said one DC output as a reference DC output, comprising:

a bleeder resistor, one of the terminals of said bleeder resistor being connected to a DC output whose voltage is lower than a voltage of the reference DC output among the plurality of DC outputs except the reference DC output, and the other terminal being connected to the reference DC output, wherein the reference DC output is an operating power source for a horizontal circuit in a television section, and one of the plurality of DC outputs except the reference DC output is an operating power source for a motor in a video section.

* * * * *